(12) United States Patent
Haeberer et al.

(10) Patent No.: US 9,708,948 B2
(45) Date of Patent: Jul. 18, 2017

(54) DEVICE FOR SUPPLYING FLUID MEDIA AT LOW TEMPERATURES

(75) Inventors: Rainer Haeberer, Bretten (DE); Matthias Horn, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 1513 days.

(21) Appl. No.: 12/520,289

(22) PCT Filed: Oct. 22, 2007

(86) PCT No.: PCT/EP2007/061288
§ 371 (c)(1),
(2), (4) Date: Jun. 19, 2009

(87) PCT Pub. No.: WO2008/074543
PCT Pub. Date: Jun. 26, 2008

(65) Prior Publication Data
US 2009/0308466 A1 Dec. 17, 2009

(30) Foreign Application Priority Data
Dec. 20, 2006 (DE) .......................... 10 2006 060 314

(51) Int. Cl.
*F16L 53/00* (2006.01)
*F01N 3/20* (2006.01)

(52) U.S. Cl.
CPC .......... *F01N 3/2066* (2013.01); *F16L 53/008* (2013.01); *F01N 2610/02* (2013.01); *F01N 2610/10* (2013.01); *F01N 2610/14* (2013.01); *F01N 2610/1486* (2013.01); *Y02T 10/24* (2013.01); *Y10T 137/6416* (2015.04); *Y10T 137/6606* (2015.04)

(58) Field of Classification Search
CPC ................ F16L 53/008; F01N 2610/10; Y10T 137/6606
USPC .......... 285/41; 137/341; 138/33, 38; 60/300, 60/303
See application file for complete search history.

(56) References Cited

U.S. PATENT DOCUMENTS 2,793,280 A * 5/1957 Harvey .......................... 137/341
3,622,747 A * 11/1971 Cibie ............................. 392/488
3,789,188 A * 1/1974 Rudbarg ....................... 392/468
(Continued)

FOREIGN PATENT DOCUMENTS

DE 102004026866 A1 12/2005
DE 102004062603 B3 7/2006
(Continued)

*Primary Examiner* — Kevin Murphy
(74) *Attorney, Agent, or Firm* — Michael Best & Friedrich LLP

(57) ABSTRACT

A device for transporting a fluid medium to a metering module for metering a liquid reducing agent into an exhaust gas system in order to reduce pollutants in an exhaust gas. The device has at least one heated transport line and at least one system component with a heated internal region. The transport line has a line connecting piece, and the system component has a module connecting piece that is directly or indirectly coupled to the line connecting piece. The device includes at least one heat conducting sleeve that can be inserted in the line connecting piece and the module connecting piece. The heat conducting sleeve is thermally coupled to the heated transport line and/or the heated internal region in order to transmit heat.

25 Claims, 2 Drawing Sheets

(56) References Cited

U.S. PATENT DOCUMENTS

| | | | |
|---|---|---|---|
| 3,791,415 A * | 2/1974 | Lawless et al. | 138/127 |
| 4,447,706 A * | 5/1984 | Eder et al. | 392/473 |
| 4,447,707 A * | 5/1984 | Baker | 392/472 |
| 4,883,943 A * | 11/1989 | Davis | 392/486 |
| 5,390,961 A * | 2/1995 | Guthrie | 285/41 |
| 5,884,475 A * | 3/1999 | Hofmann et al. | 60/274 |
| 5,921,591 A * | 7/1999 | Argent | 285/330 |
| 2006/0117741 A1* | 6/2006 | Mayer et al. | 60/286 |
| 2006/0213473 A1* | 9/2006 | Theorell et al. | 123/142.5 R |

FOREIGN PATENT DOCUMENTS

| | | |
|---|---|---|
| EP | 1818588 A1 | 8/2007 |
| GB | 2423686 A | 8/2006 |

\* cited by examiner

DEVICE FOR SUPPLYING FLUID MEDIA AT LOW TEMPERATURES

CROSS-REFERENCE TO RELATED APPLICATION

This application is a 35 USC 371 application of PCT/EP 2007/061299 filed on Oct. 22, 2007.

BACKGROUND OF THE INVENTION

Field of the Invention

The invention relates to a device for supplying fluid media that is suitable in particular even at low temperatures, that is, temperatures even below the freezing point of the fluid media. Such devices are used particularly in the context of systems for metering liquid reducing agent into exhaust systems of motor vehicles, for reducing pollutants in the exhaust gas.

Description of the Prior Art

In internal combustion engines, especially diesel internal combustion engines, in view of the more stringent exhaust gas laws expected in the next few years, the proportion of nitrogen oxides in the exhaust gas, among other components, must be reduced. For reducing the proportion of nitrogen oxide in the exhaust gas, selective catalytic reduction (SCR), for instance, is performed, in which the nitrogen oxides are reduced to nitrogen and water with the aid of reducing agents. An aqueous urea solution, for instance, is used as the reducing agent.

The reducing agent is typically stored in a tank and supplied via a line from the tank to a metering module, with which the reducing agent is injected, into the exhaust tube, for instance. One example of such a device is shown in European Patent Disclosure EP 0 982 884 A2.

Instead of the system shown in EP 0 982 884 A2, in which the reducing agent is introduced into the catalytic converter with the addition of compressed air, simpler systems are often also used, in which the liquid reducing agent is supplied from a tank (which may for instance be designed in heated form) via a supply module and corresponding lines to the metering module, so as to be injected there into the exhaust gas.

The liquid reducing agents currently usual (such as the aforementioned aqueous urea solution), however, depending on the (optionally) added antifreeze agents, freeze at between approximately −11° C. and −40° C. Thus the described system is often only indirectly available under certain ambient conditions. Special heating measures are therefore typically taken in order to convert the reducing agent in the system into the liquid state. Therefore often not only the tank but also the supply module and/or the lines used are designed as completely or partly heated. With these provisions, it is as a rule assured that the system will be operationally ready after a specified time.

Despite the aforementioned heating provisions, however, a frequent problem is that the interface between individual system components, such as the components comprising the tank, supply module and line or line segments, can be thawed only poorly because of the specified nature of the heating. Even if the individual system components themselves have thawed, in many cases the interfaces are still frozen, which reduces or even prevents the availability of the system. This is due in particular to the fact that the electric heating can be brought to the interface only with major effort and expense.

In many cases, hydraulic connection pieces are needed for the interfaces. Heating these hydraulic connection pieces, which as a rule are not part of the heating circuit or circuits of the system components, has proved to be exceedingly difficult.

SUMMARY OF THE INVENTION

According to the invention, a device for supplying a fluid medium is therefore proposed which advantageously refines the devices known from the prior art and overcomes the interface problems described above. The fluid media may be various in their nature, in particular being gaseous or liquid, and preferably, the device is arranged for supplying one or more liquid reducing agents for reducing the pollutant emissions in a motor vehicle.

The proposed device furnishes an interface between a heated supply line and a system component and can also be called a hydraulic interface or hydraulic connection piece. The system component may in particular include a supply module or a working container or a further supply line. However, connection to other kinds of system components of a supply system for supplying fluid media is also conceivable, such as a distributor or the like, as well as a connection to a combination of such system components.

The interface is capable of being thawed within the briefest possible time by suitable heating provisions, without requiring that complicated heating provisions be provided in the interface itself. Analogously, even very slight heating capacities can prevent freezing of the interface. The availability of the device is increased greatly by the embodiment according to the invention. Waiting times that are associated with thawing of the interface are shortened considerably, which increases the usability, particularly in the automotive field, as well as the user friendliness.

One concept of the invention is to separate the fluidic coupling between the supply line and the system component (that is, in particular, a secure mechanical coupling, if at all possible in conjunction with great impermeability to the fluid medium) from the thermal functionality. Accordingly, besides a line connection piece on the supply line side and a module connection piece coupled to it on the system component side (which together form the interface and furnish the functionality of the mechanical/fluidic coupling), the device has a heat-conducting sleeve, which transmits heat from the heated supply line and/or a heated internal region of the system component to the interface.

As a result of this heat transmission by means of the heat-conducting sleeve, independent heating of the interface can be dispensed with, or the effort and expense for such heating can be reduced sharply. The interface can thus be constructed simply and economically.

BRIEF DESCRIPTION OF THE DRAWINGS

Exemplary embodiments of the invention are described in further detail below in conjunction with the drawings, in which.

DESCRIPTION OF THE PREFERRED EMBODIMENTS

Figure 1:
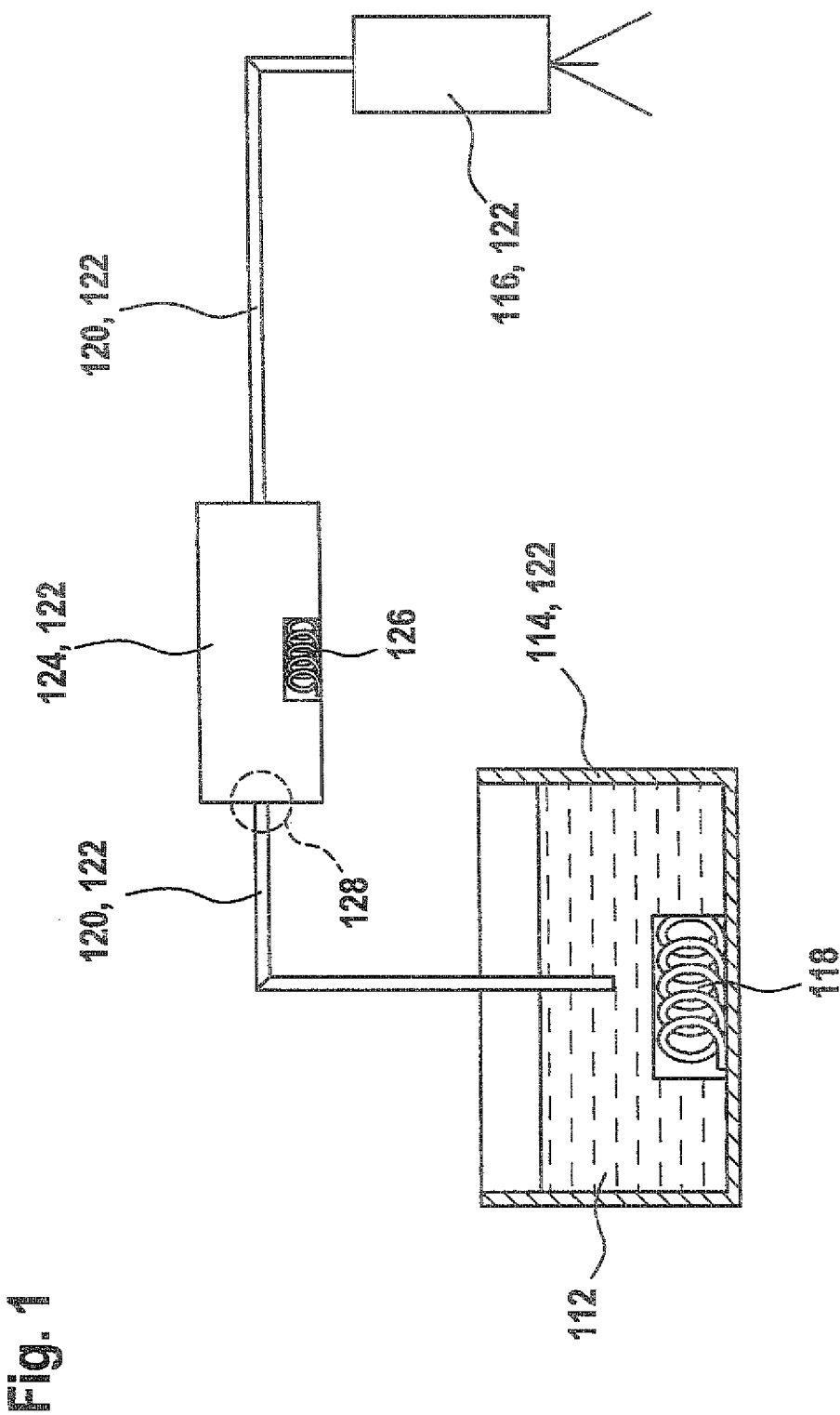
FIG. 1 shows an exemplary embodiment of a system according to the invention for metering a liquid reducing agent into an exhaust system.

In FIG. 1, an exemplary embodiment of a system 110 for metering a liquid reducing agent 112 from a working container 114 into the exhaust system of an internal combustion engine particularly in the region of a catalytic converter) via a metering module 116 is shown schematically. The metering module 116 may for example be designed as in the prior art discussed at the outset, for instance in the form of a pressure-controlled injection valve.

In the system 110 shown here, the working container 114 is provided with a container heater 118, by means of which the liquid reducing agent 112 can be brought to a working temperature and/or by means of which freezing of the liquid reducing agent 112 in the working container 114 can be prevented.

As described above, unavoidable interfaces between supply lines 120 and further system components 122 are problematic in such systems 110 of the kind shown for example in FIG. 1. The term "system component" is understood to mean in particular components which are suitable for receiving and/or supplying the liquid reducing agent 112 (or logically other fluid media), that is, which have corresponding hollow spaces and/or lines. Accordingly, examples that can be considered for the system components 122 are the working container 114, the metering module 116, the supply lines 120 themselves (for instance in the context of coupling two different lines), or even a supply module 124 to which a supply line 120 is to be connected in the context of assembling the system 110.

The supply module 124 may for instance have a pump (such as a diaphragm pump) and preferably a heating element 126 for thawing the reducing agent 112 or for maintaining an operating temperature. The supply lines 120 as well are embodied as correspondingly heated.

Figure 2:
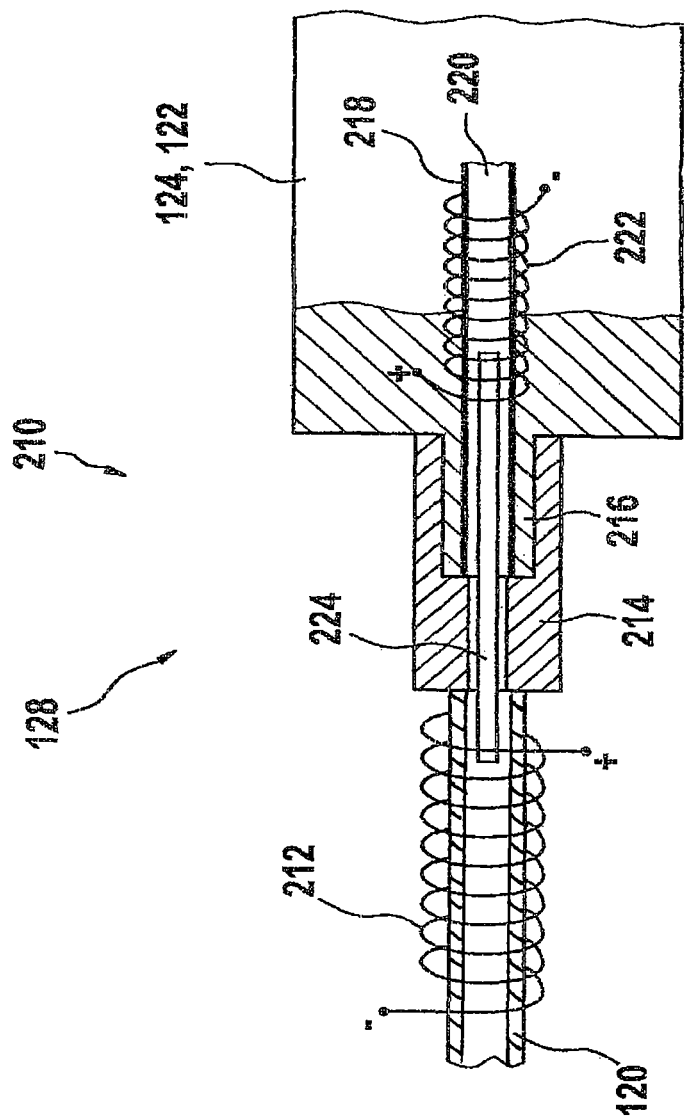
FIG. 2 shows an exemplary embodiment of a device for supplying a fluid medium.

In FIG. 2, a device 210 according to the invention for supplying a fluid medium is shown. It is assumed hereinafter that this device includes an interface between a supply line 120 and the supply module 124, the interface being identified symbolically by reference numeral 128 in FIG. 1. However, as described above, still other interfaces are possible, for instance interfaces of the supply lines 120 with the working container 114, further supply lines 120, or the metering module 116.

In the device 210 shown in FIG. 2, the supply line 120 has a line heater 212, which is shown symbolically in FIG. 2 as a heating coil. Still other embodiments of the line heater are understood to be conceivable. The supply line 120 itself may for instance be made from a plastic material, such as a conventional or a thermally conductive plastic material (for example, a plastic filled with a thermally conductive filler), or from a metal material, for example.

On the end of the supply line 120, there is a line connection piece 214, which is connected to the supply line 120. The line connection piece 214 is not engaged by the line heater 212 and thus is largely unheated. The line connection piece 214 may for instance be embodied of plastic or also of metal (such as aluminum or brass) and represents the female plug part of the interface 128.

As a counterpart to the line connection piece 214, the supply module 124 has a stublike module connection piece 216 disposed on the housing of the supply module 124. This module connection piece 216 forms the male part of the interface 128 and is embodied accordingly, for being fitted into the end of the line connection piece 214. For example, this module connection piece 216 can also be made from plastic or a metal material.

In the coupled state, shown in FIG. 2, the module connection piece 216 and the line connection piece 214 thus form the hydraulic interface that assures the mechanical functions of the interface 128. Still other elements, not shown in the drawings, may be provided in order to improve the mechanical coupling, such as threads, union nuts, or connecting hooks between the module connection piece 216 and the line connection piece 214.

In the interior of the supply module 124, which may for instance include a pump, there is a further line 218, with an internal region 220. When the interface 128 is in the coupled state, this internal region 220 communicates fluidically with the interior of the supply line 120. If instead of the supply module 124, some other fluid element, such as the working container 114, is used as the system component 122, then the interior of that container plays the role of the internal region 220.

A module heater 222 is also located in the interior of the supply module 124 and in the schematic illustration of FIG. 2 it is embodied as a heating coil. Still other kinds of embodiment of his module heater 222 are conceivable, however, such as heating coils in the form of heating blankets, heaters that plunge into the fluid medium or the like. The module heater 222 serves to subject the line 218 and its internal region 220 accordingly to heat, in order to prevent freezing of the fluid medium or to thaw it as applicable.

As shown in FIG. 2, the actual interface 128, that is, in particular the line connection piece 214 and the module connection piece 216, are embodied here as unheated. However, the interface 128 may be surrounded, entirely or in part, with a thermal insulation not shown in FIG. 2, such as sheathing (for instance of woven fabric, glass fiber, or the like). Preferably, this thermal sheathing, or the material used in it, has a thermal conductivity of less than 0.1 W/(m*K).

To prevent freezing of the interface 128, the device 210 has a heat-conducting sleeve 224, which is inserted into the fluidic communication between the supply line 120 and the line 218. In the view shown in FIG. 2, this heat-conducting sleeve 224 is embodied in one piece, but multiple-part embodiments of the heat-conducting sleeve 224 are also conceivable, for instance in the form of one sleeve part associated with the line connection piece 214 and one sleeve part associated with the module connection piece 216.

Preferably, a cylindrical heat-conducting sleeve 224 is used here that itself has an inner hollow space and that establishes a fluidic communication between the supply line and the internal region 220. Alternatively, however, a rodlike construction, for instance, that is bathed by the fluid medium, or more-complex flow geometries of the heat-conducting sleeve 224, could be used.

As the material for the heat-conducting sleeve 224, a material with a thermal conductivity of more than 100 W/(m*K) is preferably used. Metals, such as copper, aluminum, brass, zinc, silver, gold, magnesium or tungsten, as well as alloys of those metals, have therefore proved especially suitable. These metals may also be coated, for instance for protection against the liquid reducing agent 112, with a preferably thin (for instance, no more than 500 micrometers thick) chemically resistant protective layer (such as Teflon or some other plastic or a multilayer plastic composition). Alternatively or in addition, graphite or thermally conductive plastics, such as plastics filled with graphite particles or metal particles, may be used as material for the heat-conducting sleeve 224.

The heat-conducting sleeve 224 is thermally in contact with at least one of the regions heated by the heaters 212 and 222, in order to transmit heat from these regions to the interface 128. This thermal contact may be designed in the form of either heat conduction or heat radiation. The heat transmission coefficient should be greater than the heat transmission between the supply line 120 and the line connection piece 214 or between the module connection piece 216 and the heated internal region 220.

For instance, the heat-conducting sleeve 224 may be embodied as a tube inserted with a press fit into the supply line 120. Alternatively or in addition, the heat-conducting sleeve 224 may also be inserted into the line 218 in the internal region 220 of the supply module 124. In this way, fast, safe thawing of the interface 128 is assured, and freezing of this interface 128 can be prevented in a simple way. In particular if the system 110 is used as a metering system in the SCR described above, in which operational readiness must be brought about within the shortest possible time, this embodiment of the interface 128 also has a positive effect.

Thus the interface 128 is embodied such that the two connection pieces 214, 216 take over the mechanical function of the connection as well, optionally, a fluidic function (for instance in the context of a hydraulic communication). The heat transmission to the interface 128 or to the heater itself, conversely, is taken on by the heat-conducting sleeve 224, which is embodied as a separate component and can also simultaneously, at least in part, take on fluidic functions.

The materials comprising the heat-conducting sleeve 224 and the connection pieces 214, 216 may thus, depending on these separate functionalities, be optimized separately to suit the respective demands made of them.

In closing, it should also be noted that the coupling of the interface 128 may also, in a departure from the coupling shown in FIG. 2, be designed simply with two connection pieces 214, 216, for instance using an intermediate piece (adapter), or in other words in the form of an indirect coupling. In that case, the heat-conducting sleeve 224 will advantageously be designed such that it also entirely or partially penetrates the adapter, to prevent freezing of this adapter or to enable thawing of this adapter without using an additional heater in the adapter.

The foregoing relates to the preferred exemplary embodiments of the invention, it being understood that other variants and embodiments thereof are possible within the spirit and scope of the invention, the latter being defined by the appended claims.

What is claimed is:

1. A device for supplying a fluid medium for metering a liquid reducing agent into an exhaust system for reducing pollutants in an exhaust gas, the device comprising:
at least one supply line having a first heater and a line connection piece, wherein the line connection piece includes a male or a female mating component;
at least one system component with an internal region having a second heater to heat the internal region; and
at least one heat-conducting sleeve,
wherein the at least one system component has a module connection piece having a male or a female mating component, wherein the male or female mating component of the module connection piece is coupled directly to the respective female or male mating component of the line connection piece to form an interface;
wherein the at least one heat-conducting sleeve extends through the interface into the line connection piece and the module connection piece,
wherein the heat-conducting sleeve is thermally coupled to the first heater and to the second heater for transmitting heat to the interface, and
wherein the sleeve provides a fluid connection between the at least one supply line and the internal region of the at least one system component.

2. The device as defined by claim 1, wherein the heat-conducting sleeve establishes a fluidic communication of the supply line and the internal region.

3. The device as defined by claim 2, wherein the heat-conducting sleeve has a cylindrical sleeve.

4. A system for metering a liquid reducing agent into an exhaust system for reducing nitrogen oxides in an exhaust gas, including at least one metering module, and at least one device as defined by claim 2.

5. The device as defined by claim 1, wherein the heat-conducting sleeve has a cylindrical sleeve.

6. A system for metering a liquid reducing agent into an exhaust system for reducing nitrogen oxides in an exhaust gas, including at least one metering module, and at least one device as defined by claim 5.

7. The device as defined by claim 1, wherein the heat-conducting sleeve is a component of at least one of the following elements: the line connection piece and the module connection piece.

8. The device as defined by claim 1, wherein one of the line connection piece and the module connection piece is embodied without its own heating.

9. The device as defined by claim 1, wherein the line connection piece and/or the module connection piece is insulated thermally by sheathing including insulating material with a thermal conductivity of less than 0.1 W/(m*K).

10. A system for metering a liquid reducing agent into an exhaust system for reducing nitrogen oxides in an exhaust gas, including at least one metering module, and at least one device as defined by claim 9.

11. The device as defined by claim 9, wherein insulating material has a thermal conductivity of less than 0.06 W/(m*K).

12. The device as defined by claim 9, wherein the line connection piece and/or the module connection piece is insulated thermally by complete or partial sheathing which includes an insulating material.

13. The device as defined by claim 1, wherein the heat-conducting sleeve includes a material having a thermal conductivity of more than 100 W/(m*K).

14. The device as defined by claim 1, wherein the heat-conducting sleeve includes at least one of the following materials: metal, graphite and a thermally conductive plastic.

15. The device as defined by claim 14, wherein the metal is one or more of the metals copper, aluminum, brass, zinc, silver, gold, magnesium and tungsten.

16. The device as defined by claim 14, wherein the thermally conductive plastic is a plastic filled with graphite particles or with metal particles.

17. A system for metering a liquid reducing agent into an exhaust system for reducing nitrogen oxides in an exhaust gas, including at least one metering module, and at least one device as defined by claim 1.

18. The device as defined by claim 1, wherein the heat-conducting sleeve is embodied as a tube that is press fit into the supply line.

19. The device as defined by claim 1, wherein the heat conducting sleeve extends axially from the first heater to the second heater.

20. The device as defined by claim 1, wherein the heaters are disposed at opposite ends of the heat conducting sleeve.

21. The device as defined by claim 1, wherein one end of the heat conducting sleeve is surrounded by the first heater and an opposite end of the heat conductive sleeve is surrounded by the second heater.

22. The device as defined by claim 1, wherein the system component is a supply module and the second heater is inside the supply module.

23. The device as defined by claim 1, wherein the at least one system component includes at least one of the following elements: a supply module; a working container; and a further supply line.

24. The device as defined by claim 1, wherein the heat-conducting sleeve is threadless.

25. The device as defined by claim 1, wherein the first heater and the second heater are separated by a gap, and wherein portions of both the first heater and the second heater extend around the heat-conducting sleeve.

* * * * *